(12) United States Patent
Bründl

(10) Patent No.: US 11,885,657 B2
(45) Date of Patent: Jan. 30, 2024

(54) MEASURING DEVICE

(71) Applicant: Endress+Hauser Wetzer GmbH+Co. KG, Nesselwang (DE)

(72) Inventor: Harald Bründl, Schwabhausen (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 0 days.

(21) Appl. No.: 17/757,373

(22) PCT Filed: Dec. 1, 2020

(86) PCT No.: PCT/EP2020/084123
§ 371 (c)(1),
(2) Date: Jun. 15, 2022

(87) PCT Pub. No.: WO2021/121912
PCT Pub. Date: Jun. 24, 2021

(65) Prior Publication Data
US 2023/0021698 A1    Jan. 26, 2023

(30) Foreign Application Priority Data
Dec. 16, 2019   (DE) .................... 10 2019 134 440.9

(51) Int. Cl.
| | | |
|---|---|---|
| *G01F 1/684* | (2006.01) |
| *G01F 15/00* | (2006.01) |
| *G01F 1/692* | (2006.01) |
| *G01K 7/16* | (2006.01) |
| *G01K 1/16* | (2006.01) |
| *G01F 23/24* | (2006.01) |

(52) U.S. Cl.
CPC .............. *G01F 1/684* (2013.01); *G01F 1/692* (2013.01); *G01F 15/006* (2013.01); *G01K 1/16* (2013.01); *G01K 7/16* (2013.01); *G01F 23/247* (2013.01)

(58) Field of Classification Search
CPC ........ G01F 1/684; G01F 1/692; G01F 15/006; G01F 23/247; G01K 1/16; G01K 7/16
See application file for complete search history.

(56) References Cited

U.S. PATENT DOCUMENTS

| | | | | |
|---|---|---|---|---|
| 5,831,159 A | * | 11/1998 | Renger ................. | A61B 5/028 73/204.11 |
| 10,768,032 B2 | * | 9/2020 | Schultheis ............. | G01F 1/684 |
| 10,768,052 B2 | * | 9/2020 | Umkehrer ............. | G01K 1/026 |
| 11,435,236 B2 | * | 9/2022 | Saecker ................ | G01K 5/025 |
| 11,480,456 B2 | * | 10/2022 | Umkehrer ............. | G01F 1/684 |
| 11,480,476 B2 | * | 10/2022 | Saecker ................ | H01C 17/00 |
| 11,566,946 B2 | * | 1/2023 | Umkehrer ............ | G01K 15/005 |

(Continued)

FOREIGN PATENT DOCUMENTS

| | | |
|---|---|---|
| DE | 10060027 A1 | 6/2002 |
| DE | 102006048448 A1 | 4/2008 |

(Continued)

*Primary Examiner* — Ryan D Walsh
(74) *Attorney, Agent, or Firm* — Christopher R. Powers; Endress+Hauser (USA) Holding, Inc.

(57) ABSTRACT

The present disclosure relates to a device for determining and/or monitoring at least one process variable of a medium including at least one sensor element and a unit at least partially including a material with anisotropic thermal conductivity. According to the present disclosure the unit is frictionally connected to the sensor element, and in particular the unit is frictionally fastened on a surface of the sensor element.

15 Claims, 2 Drawing Sheets

(56) References Cited

U.S. PATENT DOCUMENTS

| | | | | |
|---|---|---|---|---|
| 2007/0259211 A1* | 11/2007 | Wang | ............ | H01L 23/3737 |
| | | | | 524/404 |
| 2010/0132479 A1* | 6/2010 | van Willigen | .......... | G01F 1/584 |
| | | | | 73/861.12 |
| 2011/0133236 A1 | 6/2011 | Nozaki | | |
| 2011/0301493 A1 | 12/2011 | Husheer | | |
| 2012/0051389 A1* | 3/2012 | Schalles | ............... | G01K 15/002 |
| | | | | 374/1 |
| 2012/0160024 A1* | 6/2012 | Matsumoto | ........... | G01F 15/185 |
| | | | | 73/204.11 |
| 2015/0308875 A1* | 10/2015 | Muller | .................... | G01F 1/692 |
| | | | | 73/204.26 |
| 2020/0271495 A1* | 8/2020 | Umkehrer | .............. | G01F 1/6847 |
| 2021/0270679 A1* | 9/2021 | Peuker | ...................... | G01K 1/16 |
| 2022/0397438 A1* | 12/2022 | Koch | .................... | G01F 1/6888 |
| 2023/0143794 A1* | 5/2023 | Fortunato | ................ | G01K 1/16 |
| | | | | 374/158 |
| 2023/0147830 A1* | 5/2023 | Fortunato | ................ | G01K 1/16 |
| | | | | 374/208 |

FOREIGN PATENT DOCUMENTS

| | | | | |
|---|---|---|---|---|
| DE | 102013224977 A1 | 4/2015 | | |
| DE | 102015112199 A1 | 2/2017 | | |
| DE | 102017100267 A1 | 7/2018 | | |
| DE | 102017116408 A1 | 1/2019 | | |
| DE | 102017120941 A1 | 3/2019 | | |
| EP | 2219016 A2 * | 8/2010 | .......... | A61M 1/1664 |
| KR | 20170064025 A * | 6/2017 | | |
| WO | WO-2016192929 A1 * | 12/2016 | | |
| WO | 2019015912 A1 | 1/2019 | | |
| WO | 2019048210 A1 | 3/2019 | | |

* cited by examiner

MEASURING DEVICE

CROSS-REFERENCE TO RELATED APPLICATIONS

The present application is related to and claims the priority benefit of German Patent Application No. 102019134440.9, filed on Dec. 16, 2019, and International Patent Application No. PCT/EP2020/084123, filed Dec. 1, 2020, the entire contents of which are incorporated herein by reference.

TECHNICAL FIELD

The invention relates to a device for determining and/or monitoring a process variable of a medium. The medium is preferably located in a container, for example, in a tank or in a pipe.

BACKGROUND

Such field devices are used for monitoring and/or determining at least one, for example chemical or physical, process variable of a medium. Within the framework of the present application, all measuring devices that are used in proximity with the process and supply or process process-relevant information are, in principle, termed field devices, including therefore remote I/O's, wireless adapters and general electronic components located on the field level. The companies of the Endress+Hauser Group produce and distribute a large variety of such field devices.

A field device typically comprises at least one sensor unit that at least partially and at least temporarily comes into contact with the process, as well as an electronic unit that, for example, serves to detect, evaluate and/or supply signals. At least the electronic unit of the respective field device is typically arranged in a housing with a housing inlet for introducing at least one connection cable to the field device.

Examples of field devices are fill-level measuring devices, flow measuring devices, pressure and temperature measuring devices, pH and/or pH redox potential measuring devices, or even conductivity measuring devices, which serve to detect the respectively corresponding process variables of fill-level, flow, pressure, temperature, pH, redox potential or conductivity. The respectively underlying measuring principles are sufficiently known from the prior art and are not listed individually at this point. Flow-measuring devices are, in particular, Coriolis, ultrasound, vortex, thermal and/or magnetically inductive flow-measuring devices. Fill level measuring devices in turn are especially microwave, ultrasonic, time-domain reflectometric (TDR), radiometric, capacitive, conductive and/or vibronic fill level measuring devices. Pressure measuring devices on the other hand are, for example, so-called absolute, relative or differential pressure devices.

However, without limiting generality, the following description focuses on field devices in the form of thermometers. The following considerations are each transferable to other field devices, especially to thermal flow measuring devices for determining a flow rate and/or a flow speed of a medium through a pipe, which likewise comprise at least one sensor unit with a temperature-sensitive sensor element, for example in the form of a temperature sensor.

Thermometers are known in various embodiments from the prior art, and their underlying measuring principles have also been described in detail. There are thermometers that use the expansion of a liquid, a gas or a solid with a known coefficient of expansion to measure the temperature, or others that relate the electrical conductivity of a material to the temperature by using, for example, resistance elements or thermocouples. On the other hand, radiation thermometers, in particular pyrometers, use the heat radiation of a substance to determine its temperature.

In the case of a temperature sensor in the form of a so-called "thin-film sensor", in particular a resistance temperature detector (RTD), for example, a sensor element provided with connecting wires and mounted on a carrier substrate is used, wherein the back of the carrier substrate usually has a metal coating. As sensor elements, so-called "resistance elements", for example, in the form of platinum elements, are used, which among other things are also commercially available under the designations PT10, PT100 and PT1000.

The resistance elements are often introduced by means of a soldering process, especially by means of SMD soldering, within a sensor head, for example a sensor tip, and especially onto the inner floor of a sleeve consisting, for example, of stainless steel. Methods for producing such a solder connection for a thermometer have become known, for example, from the disclosures DE102006048448A1 or DE102015112199A1. The production of a solder connection is advantageously associated with a high degree of mechanical stability of the thermometer in question. In principle, however, the solder connection also has a great influence on the thermal properties of the thermometer, especially on the thermal coupling between the resistance element and the sensor head.

This relates especially to the grade or quality of the respective soldering point, and also to its reproducibility. For example, it should be ensured that the same amount of solder is always used for each soldering point. With regard to the grade or quality, wetting of the solder on the respective surface, inter alia, plays an important role. Furthermore, the stability of the solder connection and the geometric distribution of the solder between the two components are of central importance. It should be noted that this list is by no means exhaustive. Rather, some possible aspects that can negatively influence the thermal properties of the thermometer are mentioned by way of example.

SUMMARY

The object of the present invention is therefore to provide a device that has a high degree of mechanical stability.

This object is achieved by a device for determining and/or monitoring at least one process variable of a medium, comprising at least one sensor element and a unit at least partially comprising a material with anisotropic thermal conductivity. According to the invention, the unit is frictionally connected to the sensor element, and in particular the unit is frictionally fastened on a surface of the sensor element.

The use of units comprising materials with anisotropic thermal conductivity has become known, for example, from DE102017100267A1 in connection with a device with which two sensor elements in a single sensor head are held in thermal equilibrium at all times. A similar concept is pursued in DE102017116408A1 in connection with a thermal flow measuring device. Reference is made to both applications in full in respect of the unit. Within the framework of the present invention, however, such a unit is used simultaneously to ensure good mechanical stability of the device, especially with good thermal properties at the same time. The unit comprising the material with anisotropic thermal conductivity serves for the frictional connection of the sensor element and moreover ensures a uniform distribution of the heat, especially the existence of thermal equilibrium. Advantageously, by means of the solution according to the invention, thermally induced mechanical stress, for example from different thermal expansion coefficients of the different materials used in each case, are also reduced.

In one embodiment of the invention, the sensor element is a temperature sensor. The device in this case is, for example, a thermometer or a flow measuring device operating according to the thermal measuring principle.

However, a device according to the invention can also have more than one sensor element. In this case, at least two sensor elements are preferably frictionally connected to a single unit comprising a material with anisotropic thermal conductivity. In this case, the at least two sensor elements are advantageously always in thermal equilibrium. Advantageously, this can be ensured especially also when the at least two sensor units cannot be arranged directly together within the device, for example, because of design restrictions.

It is self-evident that not only multiple sensor elements, but also at least one sensor element and at least one further component, can be frictionally connected by means of a single unit. For example, in addition to a sensor element, a heating/cooling element and/or a reference element, especially for in situ calibration of the sensor element, can also be frictionally fastened on the same unit.

The unit is designed especially in the form of an elongate element, wherein the thickness of the element is small relative to the length and/or width of the element. Thus, in one embodiment of the device according to the invention, the unit is a thin film, which film consists at least partially of the material with anisotropic thermal conductivity. A unit designed in this way can be introduced in a particularly space-saving manner into a sensor unit of a field device.

In one embodiment of the device, the material with anisotropic thermal conductivity is an at least partially carbon-containing material, especially graphite, or hexagonal boron nitride. Preferably. The unit preferably has a higher thermal conductivity along its longitudinal axis than perpendicular thereto.

In one embodiment of the invention, at least one hole is made in the unit. The unit can be frictionally connected to the at least one sensor element by means of the hole.

A further embodiment provides for the unit to have, at least in a first sub-region in which the frictional connection to the sensor element can be produced, a first diameter that is smaller than a second diameter of the unit in a second sub-region that differs from the first sub-region. Especially, the first diameter is smaller than a diameter of the sensor element in the remaining regions.

In one embodiment, the device comprises fastening means for producing the frictional connection.

In this regard, it is advantageous if the fastening means comprise a screw, a rivet or a clamp. For example, in the case of a unit that has a hole, the fastening means can serve to fasten the unit to the sensor element through the hole. Similarly, in the case of a unit with a reduced diameter in sections, a fastening around the unit is conceivable, for example by means of a suitably designed clamp.

In an alternative embodiment, the fastening means comprise a solder, especially consist of a solder. In addition to a conventional solder connection of the unit to the sensor element, it is also conceivable for the solder to extend through the hole in the case of a unit with a hole, and to achieve an effect comparable to that of a rivet, or for the solder to act like a clamp in the case of a unit having a reduced diameter in sections. Such embodiments are particularly advantageous when the sensor element and/or the unit have a comparably low wettability, so that a conventional solder connection cannot result in a reliable, frictional connection. These considerations also apply analogously to a fastening according to the invention, in this case in comparison with a conventional adhesive connection, which is based on the formation of an adhesive force between the components to be connected in each case.

In one embodiment of the device, the unit is designed in the form of a film, especially a thin, flexible film, wherein the unit is fastened to the sensor element in a first end region.

Within this framework, it is advantageous if the film is arranged and/or designed in such a way that, starting from the first end region fastened to the sensor element, it surrounds the sensor element, especially is wound around the sensor element. In this case, the film serves to produce a thermal equilibrium in a volume surrounding the sensor element by virtue of heat flowing in a direction parallel to the film. When the sensor element is introduced with the unit into a sensor housing, especially a sensor head, a restoring force of the unit is caused by the winding of the unit around the sensor element, said restoring force resulting in stable positioning inside the housing or sensor head. Such a sensor housing can especially be a protective tube for a thermometer.

It is further advantageous if the unit is frictionally fastened in a second end region to a further component of the device, especially in a sensor housing in which the sensor element is arranged, or to a carrier element on which the sensor element is arranged. The sensor housing can, for example, be a sensor head. In the case of a thermometer, the sensor housing can be a protective tube. In the case of a carrier element, it can especially be a flat element on which at least the sensor element is arranged and by means of which the sensor element can be fastened to a container containing the medium.

The unit serves both to mechanically fasten the sensor element to the further component and to ensure optimal, especially uniform, heat distribution from the process. It is thus possible to ensure a frictional connection between the sensor element and the further component that is simple to realize and does not cause any disadvantageous influence on the thermal properties. In addition, mechanical stresses and forces on the sensor element can be minimized or even eliminated by the use of the unit for producing the frictional connection.

In an alternative embodiment, the unit is designed in the form of a film, especially a thin, flexible film, wherein the unit is fastened to the sensor element in a central region.

Within this framework, it is again advantageous if the film, starting from the central region fastened to the sensor element, is arranged at least partially around the sensor element on two mutually opposing sides of the sensor element. Similar to a fastening in an end region of the unit, it can be achieved in this way that the unit to achieve for uniform heat distribution in a volume surrounding the sensor element. Especially, a thermal equilibrium of the sensor element, the unit and at least one further component of the device can be achieved by means of the unit.

In summary, the present invention can reduce thermal contact resistances within a field device, and at the same time a high degree of mechanical stability can be ensured. Especially, mechanical stresses occurring in other ways as a result of different coefficients of thermal expansion of different materials can be avoided.

BRIEF DESCRIPTION OF THE DRAWINGS

The invention is explained in more detail based upon the following drawings. The following are shown.

DETAILED DESCRIPTION

Figure 1:
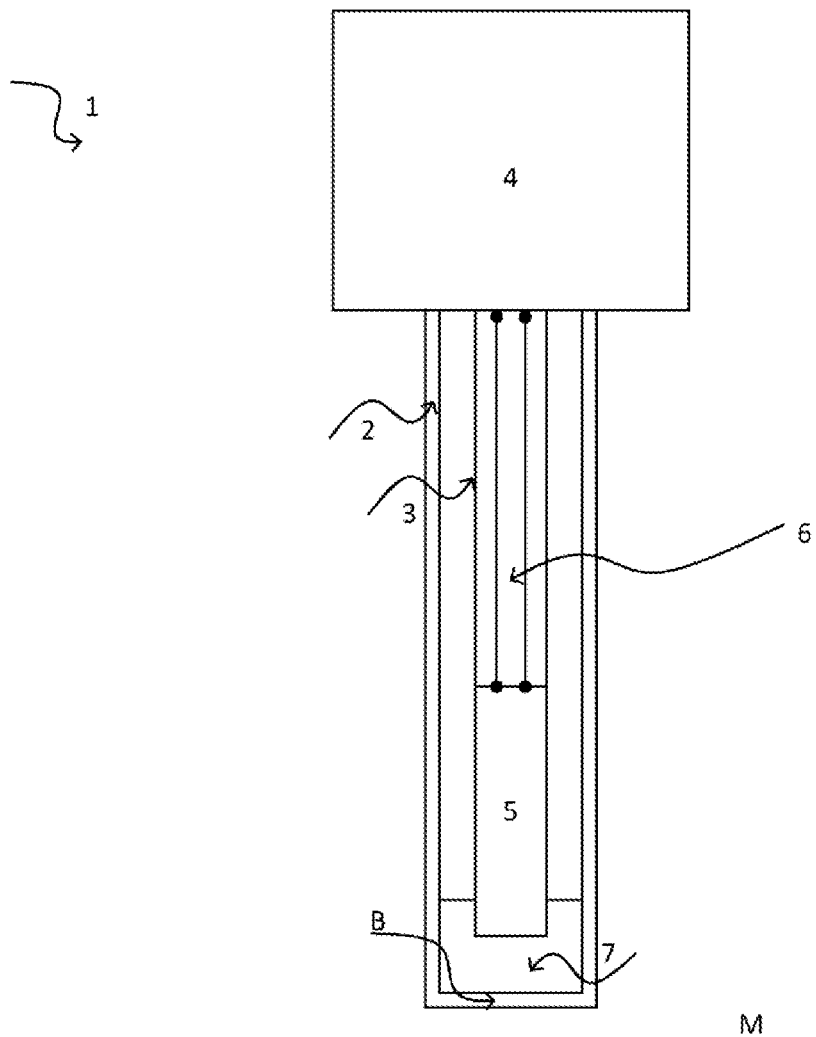
FIG. 1 shows a schematic diagram of a thermometer with a sensor element in the form of a temperature sensor according to the prior art arranged in a sensor head.

FIG. 1 shows a schematic representation of a thermometer 1 with a dipping body or a protective tube 2, a measuring insert 3, and an electronic unit 4 according to the prior art. The measuring insert 3 is introduced into the dipping body 2 and comprises a sensor element 5, which in the present case is a temperature sensor in the form of a resistance element, which is contacted electrically and is connected to an electronic unit 4 via the connecting lines 6. However, the sensor element 5 does not necessarily have to be part of a measuring insert 3. In other embodiments, the electronic unit 4 can also be arranged separately from the measuring insert 3 and dipping body 2. In addition, the sensor element 5 need not necessarily be a resistance element, nor does the number of connection lines 6 used need necessarily be two. It is rather the case that, depending on the measurement principle used, a different number of connecting wires 6 can be used.

The sensor element 5 is frictionally fastened to a bottom surface B, facing the medium M, of the measuring insert 2 by means of a solder connection in an internal volume of the measuring insert 2. As already explained in the introduction, such a connection is associated with high manufacturing requirements. The quality and reproduction of the solder connection influence the thermal properties of the device 1 to a great extent.

Figure 2A:
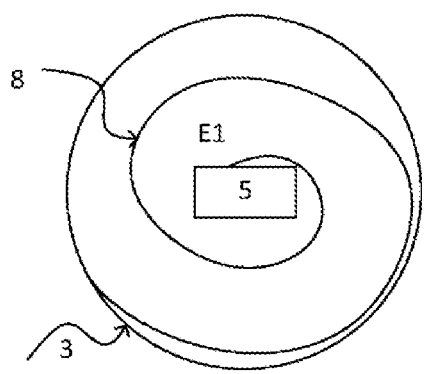
FIG. 2a shows an embodiment of a device according to the present disclosure with a unit fastened in an end region on a sensor element
Figure 2B:
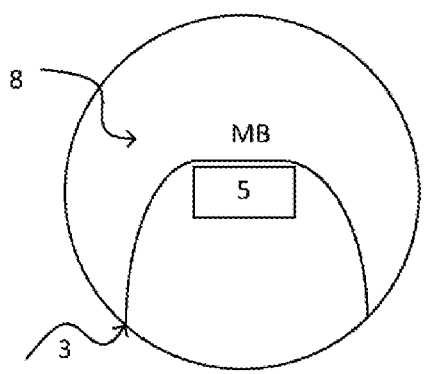
FIG. 2b shows an embodiment of a device according to the present disclosure with a unit fastened in a central region on a sensor element.

According to the present disclosure, to provide a high degree with mechanical stability with simultaneously good thermal properties, a unit 8 comprising a material with anisotropic thermal conductivity is frictionally connected to the sensor element 5, as illustrated in FIGS. 2a and 2b for two exemplary embodiments of a device according to the invention. In both embodiments, as well as for the embodiments shown below, the unit 8 is in each case produced without limiting generality in the form of a thin film of a material with anisotropic thermal conductivity, for example, graphite.

For the embodiment according to FIG. 2a, the unit 8 in FIG. 2a is fastened to the sensor element 5 in an end region E1 and wound around the sensor element 5. In the embodiment shown in FIG. 2b, however, the unit 8 is fastened to the sensor element 5 in a central region MB and surrounds the sensor element 5 on two mutually opposing sides. In both cases, the unit 8 is arranged at least partially around the sensor element 5 and at least partially surrounds the sensor element 5. In this way, a rapid heat transfer from the medium M to the sensor element 5, and thus a homogeneous heat distribution within the protective tube 2, can be ensured; especially, a region of the protective tube 2 facing the medium M, the unit 8 and the sensor element 5 are in thermal equilibrium.

To produce the frictional connection between the unit 8 and the sensor element 5, fastening means 10, 11 can be used, as illustrated by way of example in FIGS. 3a-3d.

Figure 3A:
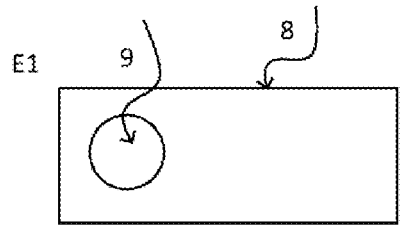
FIGS. 3a-3d show embodiments for producing a frictional connection with the aid of a solder.
Figure 3B:
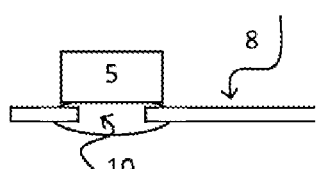
Figure 3C:
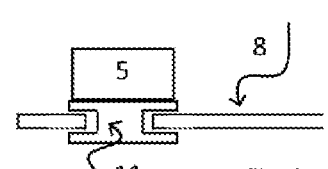
Figure 3D:
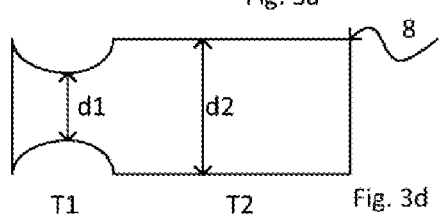

For the embodiments shown in FIGS. 3a-3c, the unit 8 has a hole 9, which in the present case is arranged in the end region E1 by way of example. The frictional connection can be produced through the hole. Fastening means 10, 11 can be used to produce the connection, as shown in FIG. 3b for the case of a solder 10 and in FIG. 3c for the case of a rivet. In this case, the solder 10 acts like a rivet 11. Alternatively, it is also conceivable for the unit E1 to have a smaller first diameter d1 in a first sub-region T1 than a second diameter d2 of the unit in a second sub-region T2. In this case, the fastening means 10, 11 can be designed, for example, in the form of a clamp [not shown], which is clamped around the unit 8 in the first sub-region T1. The diameters d1 and d2 can be constant in the two sub-regions T1 and T2 or can also be variable at least in sections.

It is also conceivable to arrange multiple identical or different sensor elements 5, or also at least one sensor element 5 and at least one further component, for example a heating/cooling element and/or a reference element for in situ calibration of at least one sensor element 5, in different regions of the unit 8. It should also be noted that the sensor element 5 and the unit 8 do not necessarily have to be arranged in a dipping body 2. For example, it is also conceivable for the unit 8 and the at least one sensor element 5 to be arranged on a carrier element [not shown here]. In this case, it is also conceivable for the unit 8 and the at least one sensor element 5 to be frictionally connected to the unit 8 and the carrier element.

One possibility for stabilization, protection and/or further thermal insulation can consist of a sheathing of the respectively used fastening means at the respective connection point. The sheathing can be, for example, an elastic coating, a potting or an adhesive.

Figure 4:
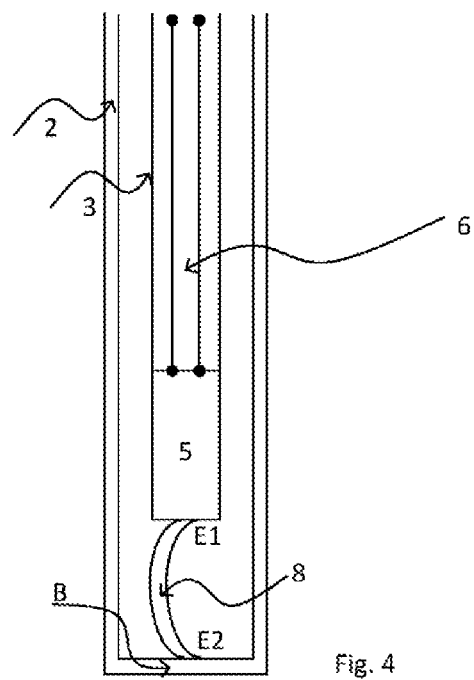
FIG. 4 shows an embodiment of a device according to the present disclosure with a unit fastened to a sensor element and to a sensor housing.

A further embodiment is shown in FIG. 4. In this embodiment, the unit 8 is also designed in the form of a thin film. It is frictionally connected in a first end region E1 to a sensor element 5 and in a second end region E2 to a bottom surface of a protective tube 2, in which the sensor element 5 is arranged. Alternatively, it can also be connected to a side wall of the protective tube 2 or to another component of the device 1.

LIST OF REFERENCE SIGNS

1 Thermometer
2 Protective tube
3 Measuring insert
4 Electronic unit
5 Sensor element
6 Connection lines
7 Solder connection according to the prior art
8 Unit with a material with anisotropic thermal conductivity
9 Hole
10 Solder
11 Rivet
B Bottom surface of the protective tube
d1, d2 Diameter of the unit T1, T2 Sub-regions of the unit
E1, E2 End regions of the unit
MB Central region of the unit
M Medium
T Temperature

The invention claimed is:

1. A device for determining and/or monitoring at least one process variable of a medium, the device comprising:
   a sensor element; and
   a unit embodied as a thin film, which at least partially comprises a material with anisotropic thermal conductivity,
   wherein the unit is frictionally fastened on a surface of the sensor element, and wherein the film is configured both to enable the frictional fastening of the sensor element and to enable a uniform distribution of heat as to facilitate a thermal equilibrium.

2. The device of claim 1, wherein the sensor element is a temperature sensor.

3. The device of claim 1, wherein the material with anisotropic thermal conductivity is an at least partially carbon-containing material or hexagonal boron nitride.

4. The device of claim 3, wherein the material with anisotropic thermal conductivity is graphite.

5. The device of claim 1, wherein the unit includes a hole therethrough.

6. The device of claim 1, wherein the unit includes, at least in a first sub-region in which the unit is frictionally fastened to the sensor element, a first diameter, which is smaller than a second diameter of the unit in a second sub-region.

7. The device of claim 1, further comprising a fastener configured to support the frictional fastening between the unit and the sensor element.

8. The device of claim 7, wherein the fastener comprises a screw, a rivet, a clamp or a solder.

9. The device of claim 7, wherein the fastener consists of a solder.

10. The device of claim 1, wherein the unit is embodied as a flexible, thin film, and wherein the unit is fastened to the sensor element in a first end region.

11. The device of claim 10, wherein the film is configured and arranged such that, starting from the first end region fastened to the sensor element, the film is wound around the sensor element.

12. The device of claim 11, wherein the unit is frictionally fastened in a second end region to a further component of the device.

13. The device of claim 12, wherein the further component is a sensor housing, in which the sensor element is disposed, or the further component is a carrier element, on which the sensor element is arranged.

14. The device of claim 1, wherein the unit is embodied as a flexible, thin film, and wherein the unit is fastened to the sensor element in a central region.

15. The device of claim 14, wherein the film is configured and arranged such that, starting from the central region fastened to the sensor element, the film is arranged at least partially around the sensor element on two mutually opposing sides of the sensor element.

* * * * *